United States Patent [19]

Crawford

[11] 4,326,571

[45] Apr. 27, 1982

[54] MOBILE DEVICE FOR HANDLING MATERIAL

[76] Inventor: Patrick J. Crawford, 1013 S. Lincoln St., Shawano, Wis. 54166

[21] Appl. No.: 123,270

[22] Filed: Feb. 21, 1980

[51] Int. Cl.³ .............................................. A01G 23/08
[52] U.S. Cl. .................................. 144/34 E; 212/238; 280/6 H; 414/687
[58] Field of Search ....................... 212/238, 253, 254; 414/687, 688, 694; 144/2 Z, 3 D, 34 R, 34 E, 309 AC; 280/6 R, 6 H

[56] References Cited

U.S. PATENT DOCUMENTS

| | | | |
|---|---|---|---|
| 3,233,909 | 4/1964 | Boone | 280/6 H |
| 3,498,350 | 3/1970 | Maradyn | 144/309AC |
| 3,572,746 | 3/1971 | Mueller | 280/6 H |
| 3,599,801 | 8/1971 | Roll | 212/238 |
| 3,601,169 | 8/1971 | Hamilton | 144/34 R |
| 3,670,834 | 6/1972 | Rogers | 280/6 H |
| 3,708,008 | 1/1973 | Duffty et al. | 144/3 D |
| 3,720,245 | 3/1973 | Puna | 144/3 D |
| 3,763,905 | 10/1973 | Hamilton et al. | 144/309 AC |
| 3,977,547 | 8/1976 | Holopainen | 414/687 |
| 4,063,359 | 12/1977 | Luscombe | 144/34 R |

*Primary Examiner*—W. D. Bray
*Attorney, Agent, or Firm*—Wicks & Nemer

[57] ABSTRACT

A mobile device for handling material of various types including a frame having an endless track mounted on each side thereof for providing mobility to the frame. A source of power in the form of an internal combustion engine is mounted directly on the frame. A turntable is rotatably mounted on the frame with a boom pivotally connected at its lower end to the turntable at a point spaced from the rotating axis of the turntable for pivotal movement of the boom in a vertical plane over the turntable by means of a hydraulic ram connected at its lower end to the turntable at a point intermediate the rotating axis of the turntable and the pivotal connection of the lower end of the boom with the upper end of the ram connected to the boom. The turntable is mounted on the frame for pivotal movement of the same with the boom thereon transversely to each side of the device. Material handling apparatus for trees may be mounted on the outer end of the boom and conventional controls are provided for actuation of the boom, the endless tracks, the turntable and the material handling apparatus.

4 Claims, 13 Drawing Figures

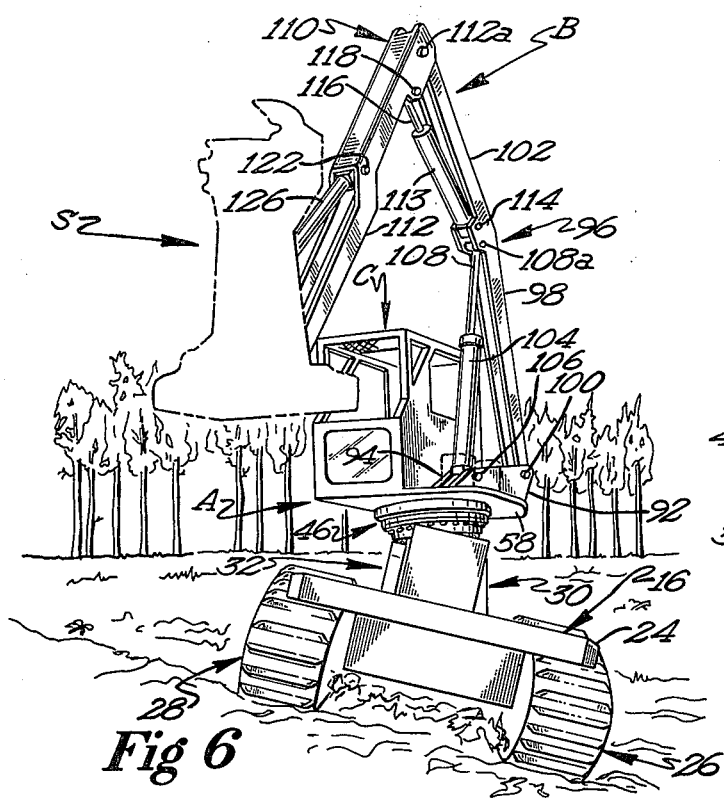
Fig 6
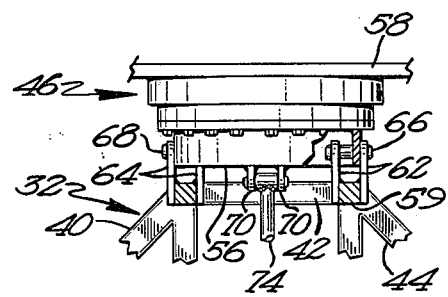
Fig 9
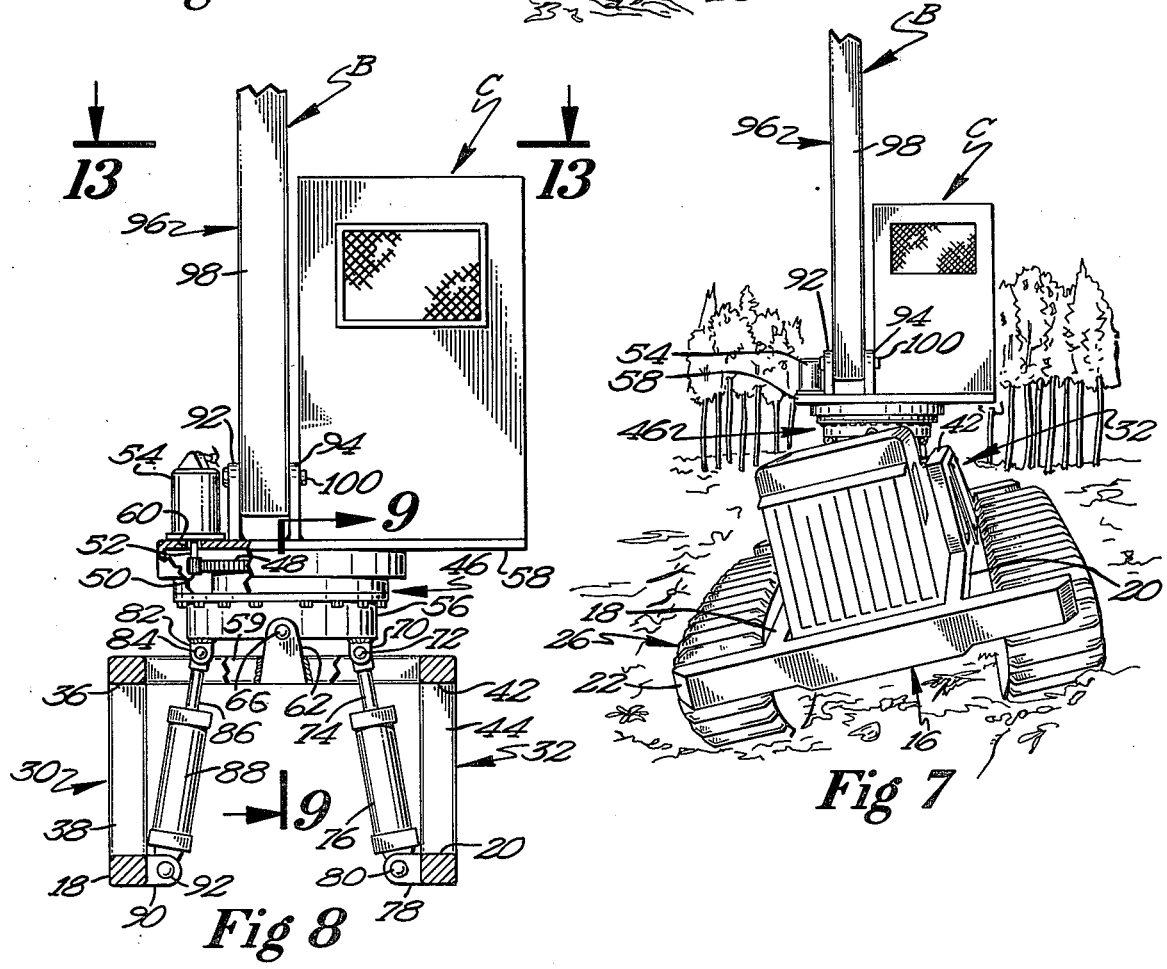
Fig 8
Fig 7

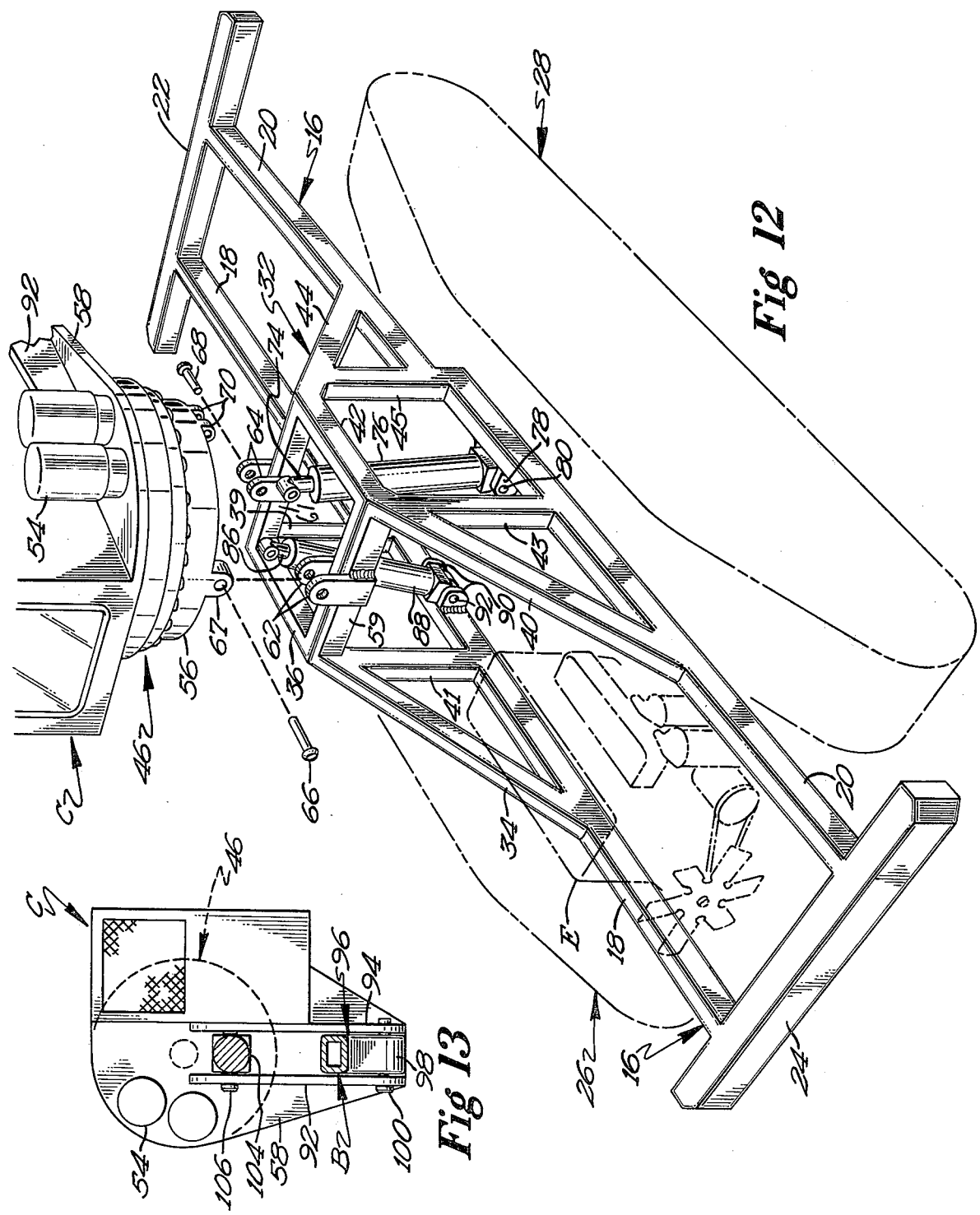

MOBILE DEVICE FOR HANDLING MATERIAL

SUMMARY

The invention herein disclosed relates to an improvement in a mobile device for handling material and with a tree handling apparatus on the boom thereof a standing tree may be delimbed, felled and moved to a desired location. Other material handling devices may be mounted on the end of the boom such as a bucket, a clam, or a grapple and the like for handling items of various natures such as dirt, containers, machines etc.

The device disclosed uses hydrostatic driven endless tracks mounted on a frame for propelling the same but differs from known machines in that the engine for providing power is mounted directly on the frame and not on the revolving roller bearing platform. Such construction allows for a unique boom geometry on the platform with which no counterbalance is needed and which gives the capability of handling, in one example, the cutting of a tree and then revolving 360 degrees, all within the width of the endless tracks.

Additionally and with reference to handling trees, the boom with a shear and delimbing clamp tower apparatus on the outer end thereof can be extended substantially straight up to their total length above the ground allowing for the delimbing of softwood trees from the top down. With the turntable mounted in the middle of the frame and above the engine it allows for the mounting of two spaced large hydraulic rams for pivoting of the turntable to either side of the device up to some 30 degrees and leaves one end of the frame for the mounting of an inverted grapple for use in skidding sheared trees or the mounting of a bunk for carrying wood in 8 foot lengths.

The device having apparatus for handling material such as trees is known in the trade as a "feller buncher" and this is the first known device designed from the ground up, primarily as a "feller buncher". Present day known bunchers are spin-offs of primarily short moving and log handling machines such as front end loaders and excavators. Advantages include the engine mounted low in the rigid main frame instead of on a rotating platform which not only lowers the center of gravity but allows the moving of the main boom and main lift cylinder pivot points well offset from the center of the turntable. With such pivot points offset greater stability is gained for the boom than hanging a large counterweight on a boom platform and the weight of the machine is reduced which gives less ground pressure and provides better maneuverability of the device.

With no counterweight and engine on a turntable platform as in known devices and the pivot points for boom and boom lift hydraulic ram offset from the center of the rotatable platform, the geometry of the booms is such that a tree can be cut, picked up and turned 360 degrees all within a nine foot overall width of the device. Known swing boom bunchers require 25 to 30 feet to be turned. Thus with applicant's device work can be done in cramped quarters and without damage to trees or other items making up the cramped quarters. With applicant's device selective tree cutting and thinning can be done much more profitably and with less damage to remaining trees.

The boom configuration also allows for a vertical reach of the extended boom to almost ninety degrees. With a delimbing top clamp on shear head apparatus mounted on the end of the boom it gives the added capability of reaching some 30 to 40 feet up a tree and delimbing the tree from the top down by simply lowering the shear.

In tree plantations where the trees are planted in rows five to six feet apart, the machine herein disclosed will row thin by delimbing, cutting and pivoting the severed trees 180 degrees all within the width of the machine and two rows of trees and placing the tree on the rear end of machine in an inverted grapple or on the ground. With the turntable tiltable to either side of the machine about thirty degrees the machine may be positioned on a slope of ground while the turntable and a cab thereon are in a level position also this feature gives extra reach in the boom down position. Additionally the turntable and boom thereon may be pivoted whereby the boom and delimber and shear thereon may be angled for positioning on a tree growing at an angle or something less then 90 degrees from the ground.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 6 is an end view of the device positioned on an inclined surface with the cab and boom horizontally disposed.

FIG. 7 is a view similar to FIG. 6 but with the incline in the opposite direction.

FIG. 8 is a transverse sectional view through the mechanism for tilting the cab and boom thereon.

FIG. 9 is a sectional view on the line 9—9 of FIG. 8.

FIG. 10 is a perspective view of the boom-mounted shear and delimbing unit.

FIG. 11 is a diagrammatic top plan view of the device shown in position in a plantation of trees to be felled and moved.

FIG. 12 is a perspective view principally of the main frame and rotatable turntable thereon with the driving tracks shown in broken lines.

FIG. 13 is a view on the line 13—13 of FIG. 8.

Figure 1:
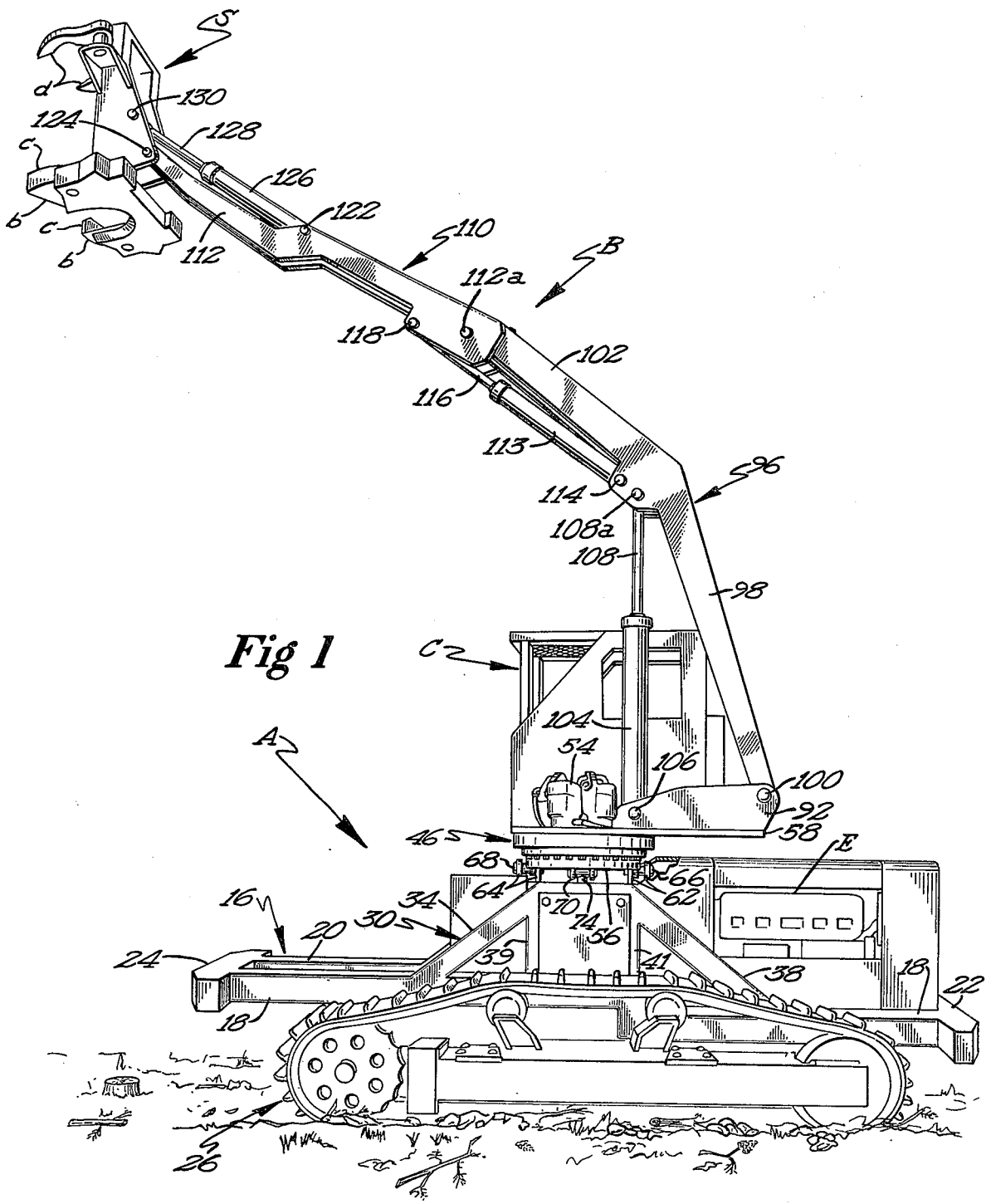
FIG. 1 is a side elevational view of a mobile tree felling and handling device embodying the invention with the pivotal boom in a raised position and in line with the longitudinal axis of the device and in the direction of the rear of the device.

Referring to the drawings in detail, the mobile tree felling and handling device A includes the longitudinally extending main frame 16. The frame 16 includes the spaced longitudinal side members 18 and 20 connected together by the front end member 22 and the rear end member 24 and the frame extends within and between the conventional endless driving tracks 26 and 28. The tracks 26 and 28 are mounted on the frame 16 adjacent the side members, respectively, by conventional means, and the tracks are independently driven by conventional means such as hydraulic motors and the like. The device A is referred to in the trade as a "feller buncher".

Mounted directly on the frame 16 between the frame side members 18 and 20 below and independent of the rotatable boom platform hereinafter described is the relatively low mounted power supply means in one form of an internal combustion engine E which supplies power to the tracks 26 and 28 and the mechanism for operation of the boom B hereinafter described. The mounting of the engine as described reduces the horizontal extent of the rotatable boom platform due to the fact that the engine in not mounted on the platform, and it provides a low center of gravity for the entire device A.

Further provided are a pair of spaced upright side mounts 30 and 32 for the cab C and boom B which are connected to the main frame side members 18 and 20, respectively. The side mount 30 includes the front oblique member 34 connected to the top member 36 which in turn is connected to the rear oblique member 38. The side mount 32 includes the front oblique member 40 connected to the top member 42 which in turn is connected to the rear oblique member 44. The members 34 and 38 of side mount 30 are connected at the lower ends to the frame side member 18, and the members 40 and 44 of side mount 32 are connected at the lower ends to the frame side member 20. The side mount 30 also includes the vertical frame members 39 and 41 connected to the frame member 18 and the top member 36. The side mount 32 also includes the vertical frame members 43 and 45 connected to the frame member 20.

Referring in particular to FIGS. 8 and 9 the numeral 46 designates a roller bearing turntable which is above and independent of the engine E and it includes the stationary ring gear 48 which is engaged by the driven pinion gear 50 mounted on the shaft 52 of the hydraulic motor 54. The turntable 46 also includes the circular base 56 on which the ring gear 48 is mounted and the rotatable platform 58 which mounts the motor 54 and the cab C independent of the engine E. The shaft 52 of the hydraulic motor extends through a hole 60 formed in the platform 58. It will be seen that the engine E is mounted relatively low with respect to and below the plane of the cab platform 58 and turntable 46 and also independent of the platform 58 on which the cab C is mounted. Controls for operation of the tracks, the turntable, the boom and a tree handling device on the end of the boom are conventional and are mounted in the cab C. Additionally, the rotatable platform 58 does not require a counterweight mounted thereon due to the location of the engine E and the geometry of the mounting of the boom as hereinafter described.

The turntable base 56 is mounted for pivotal movement to either side of the device on an axis parallel to the longitudinal axis of the device A by means of the spaced ears 62 connected to and centrally of the cross bar 59 with a first pin 66 positioned thru the ears 62 and a hole in the lug 67 connected to the base 56, particularly FIGS. 8, 9 and 12. A second pin 68 is positioned freely through holes formed in the spaced ears 64 connected to cross bar 61 and extending through holes formed in lugs identical to lugs 67 and connected to base 56 opposite lugs 67. With the turntable mounted centrally of the frame and above the engine E, it allows for the mounting of two rams hereinafter referred to for pivoting of the turntable platform transversely to either side of the machine.

With particular reference to FIGS. 8, 9 and 12 there is provided a first pair of spaced ears 70 connected to base 56, and pivotally connected therebetween by means of the pin 72 is the outer end of the piston 74 of the hydraulic ram 76. The ram 76 is pivoted at its lower end between a pair of spaced ears 78 by means of the pin 80, the ears 78 connected to the frame member 20. Additionally provided is a second pair of spaced ears 82, connected to base 56 180° therefrom and pivotally connected therebetween by means of the pin 84 is the outer end of the piston 86 of the hydraulic ram 88. The ram 88 is pivotally connected at its lower end between a pair of spaced ears 90 by means of the pin 92, the ears 90 connected to the frame member 18.

Secured to the platform 58 are a pair of upstanding boom support spaced plates 92 and 94 which extend parallel to the platform and turntable with the outer ends of the boom support plates beyond the perimeter of the turntable, said boom support plates not extending substantially beyond the width of the tracks 26 and 28 at any position of said turntable rotated relative to the device.

The numeral 96 designates a main boom member having a lower portion 98 which is pivoted at its lower end between the plates 92 and 94 by means of the pin 100 at the outer ends of the plates for pivotal movement of the boom in a vertical plane over said boom support plates and said turntable. The pivot 100 extends from the center of the turntable 46 a distance substantially no greater than one half the distance between the overall width of the tracks 26 and 28. The upper end of the lower boom portion 98 terminates in the upper portion 102 which is angularly disposed to the lower portion 98.

Further provided is the hydraulic ram 104 pivotally connected at its lower end between the inner end portions of plates 92 and 94 by pin 106 at a point intermediate the rotating axis of the turntable and the pin 100. The upper end of the piston 108 of the ram 104 is pivotally connected to the upper end of the boom portion 98 by means of the pin 108a. Pivotally connected at its lower end to the upper end of the upper main boom portion 102 is the upper boom member 110 by means of the pin 112a.

The upper boom member 110 is pivoted by means of the hydraulic ram 113 pivotally connected at its lower end to the upper main boom portion 102 by means of the pin 114 with the piston 116 of the ram pivotally connected at its outer end to the upper boom portion 110 by means of the pin 118. The outer end of the upper boom portion 110 terminates in the offset portion 112. Pivotally connected to the outer end of the offset portion 112 is the tree processing member in one form of the shear and delimbing units S by means of the pin 124. The unit S briefly includes particularly FIG. 10, the shear blades b and b and the tree-clamping jaws d and d spaced from the blades b and b. A tree is clamped in the unit S whereby it can be sheared off by means of the blades b and b and moved about with the unit S. Delimbing is accomplished by elevating the unit S to the top of a tree and allowing it to drop down the tree which severs the limbs. The unit designated as S is disclosed in U.S. Pat. No. 4,046,179 and is pivoted by means of hydrualic ram 126 pivotally connected at its lower end to the boom member 110 by means of pin 112 with the piston 128 pivotally connected at its outer end to the unit S by means of the pin 130. The boom is manipulated whereby the shear and delimbing unit S is placed at the top of a standing tree and moved down the tree thereby delimbing the tree by the shearing force of the concave cutting areas 132 and 134 of the clamps and the curved cutting member 136 of the unit S striking the limbs. With the tree delimbed the same is sheared off at the bottom by means of the shear blades b and b, and while the tree is clamped by the unit S and the butt thereof restrained by the collar portions c-c, the tree can be placed, for example, from a point in front of the device A to a point behind the unit A by rotating the turntable and cab C thereon and boom 180° between and all within the width of the tracks 26 and 28 and without contacting the rows of trees T at the sides of the device as illustrated in FIG. 11 to point Y. Alternatively the tree can be placed at any point about the device A.

OPERATION

One manner of operation of the device A is as follows: The device is moved by means of the tracks to a point adjacent a standing tree. The boom is elevated to a point whereby the delimbing and shear unit S is loosely clamped about the top portion of a tree. The unit S is caused to move downwardly and upon the tree thereby delimbing the tree by means of the cutting edges hereinbefore referred to. With the unit S at the bottom of a tree the clamps d—d are moved into tight clamping engagement with the tree and the blades b—b operated to shear off the tree at the base thereof.

Figure 2:
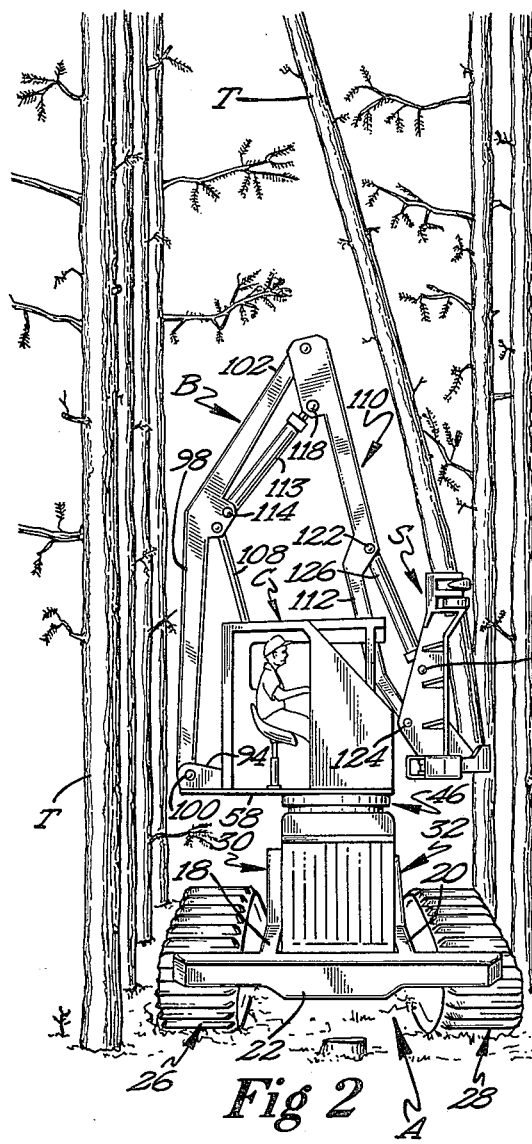
FIG. 2 is a front elevational view of the device with the cab at a right angle to the longitudinal axis of the device and the boom in a lowered compact position with the butt of a felled tree held substantially vertically in the tree shear and delimber unit.
Figure 3:
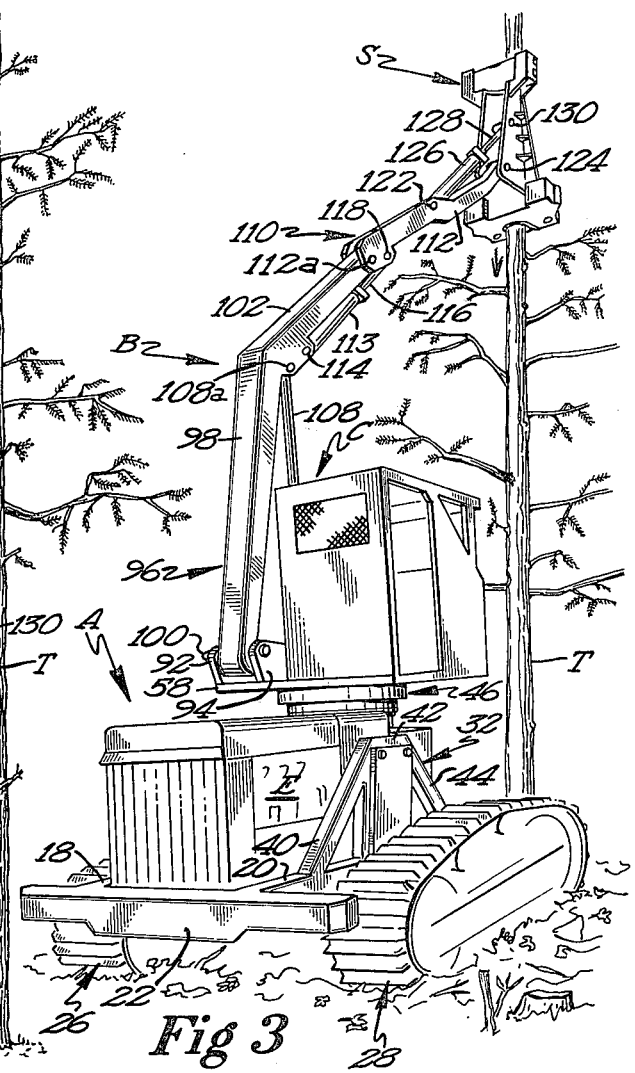
FIG. 3 is a perspective view of the device with the cab and boom in line with the longitudinal axis of the device and the boom shown in raised position with the shear and delimber in position upon the upper portion of a tree.

With the tree still clamped and held by the unit S, the tree can be rotated by means of the boom and turntable from a point P in front of the device to, for example, behind the device to point Y in plantation tree rows, FIG. 11, with the boom, cab, turntable, shear unit S and tree within the extent of the device and not contacting the row trees closely adjacent the device, FIGS. 2 and 11.

It will be seen that with the pivot pin of the lower end of the boom offset from the center of the turntable and the ram pivoted at its lower end on the turntable at a point between the rotational axis of the turntable and the boom pivot pin together with the boom pivotal over the turntable, that feature together with the engine E mounted on the frame does away with the need of a counterweight on the boom platform.

Additionally, the device may be operated as angularly disposed on the side of a hill with the cab maintained in a vertical position due to the tilting ability of the turntable, FIGS. 6 and 7. Further, with the tilt feature of the turntable and the positioning geometry of the boom pivot and ram therefore the reach of the boom is extended, particularly FIG. 4.

With a tree standing at less than 90° to the ground the shear unit S can be tilted through the boom by means of tilting the turntable 46 to accommodate the angle of the tree.

Figure 4:
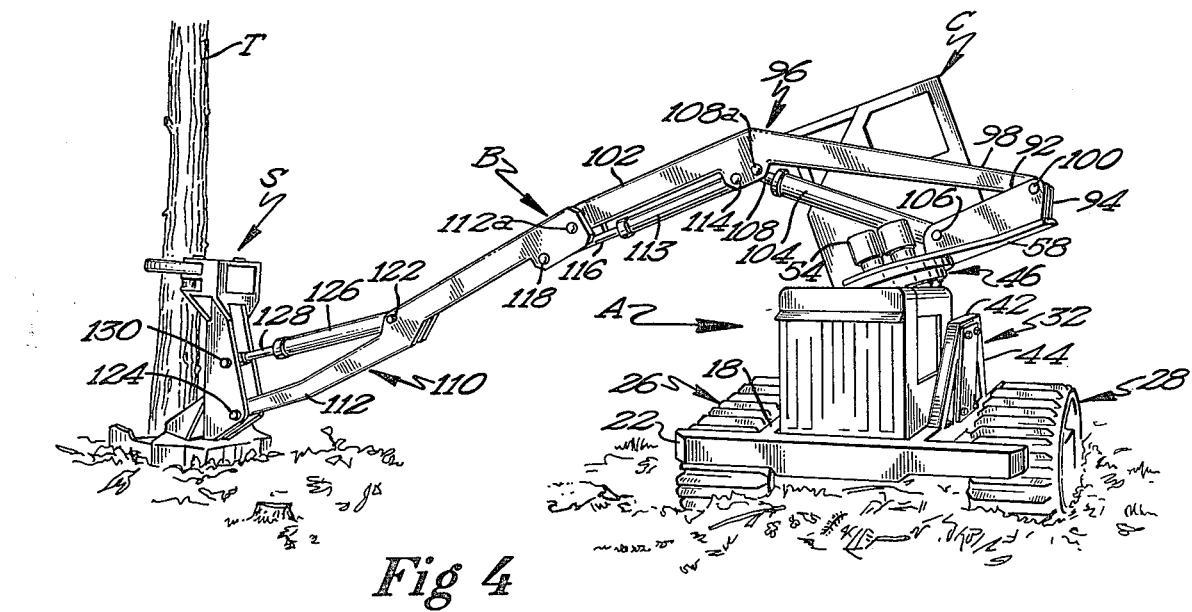
FIG. 4 is a front elevational view of the device with the boom and cab angularly lowered to one side with the tree shear and delimber in engagement with the trunk of a standing tree.
Figure 5:
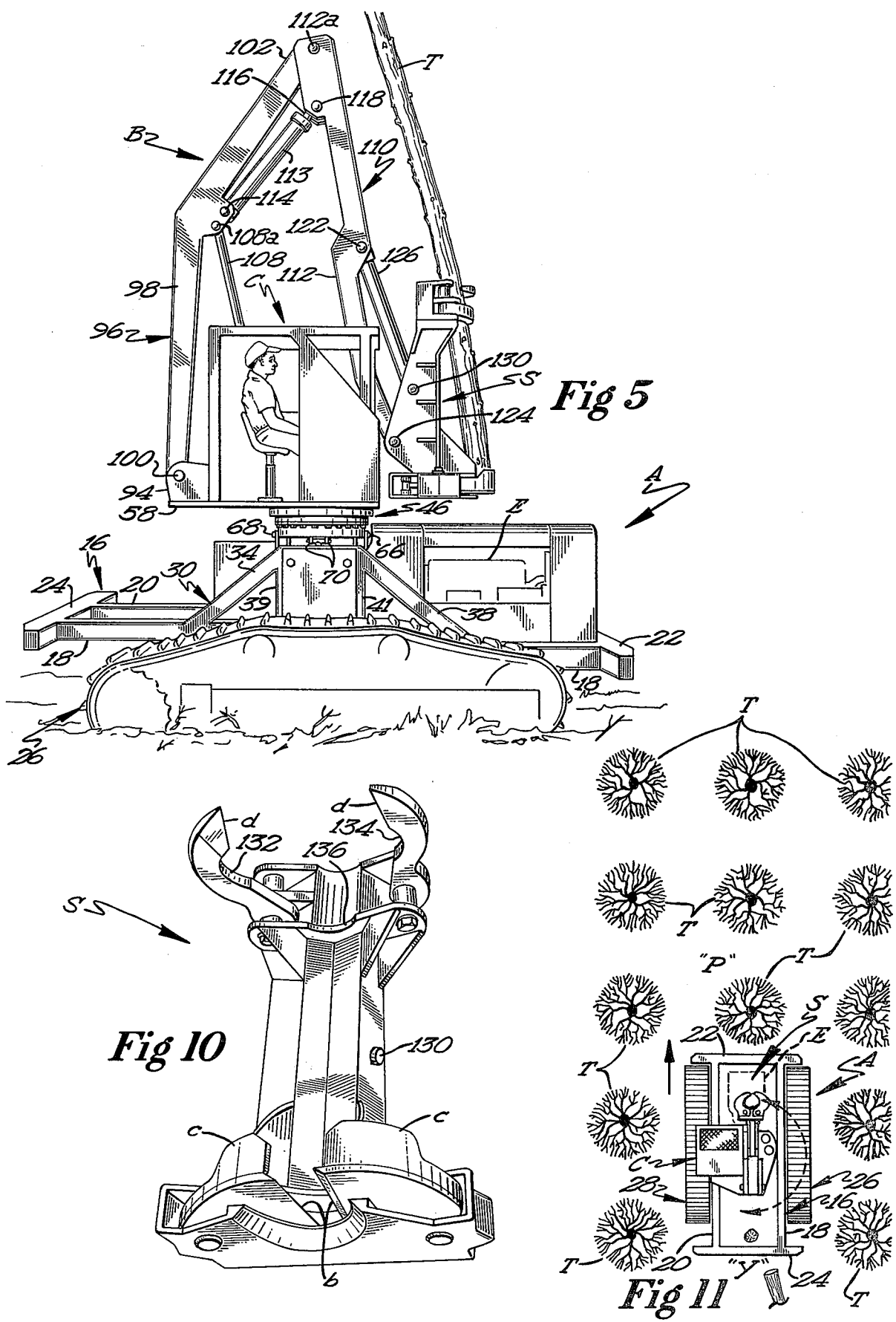
FIG. 5 is a side elevational view with the boom and cab in line with the longitudinal axis of the device and the boom in a lowered compact position with the butt end of a tree in position on the shear and delimber.

A further advantage of the turntable described is to tilt the turntable whereby the boom can reach well below the ground level of the tracks illustrated to some extent in FIG. 4. With the device described a tree may be cut, held in the position of FIG. 2 and rotated 360° within the extent of the device with less damage to remaining trees and which allows selective cutting and thinning of standing trees to be done more profitably.

Having thus described the invention, what is claimed as new and desired to be secured by Letters Patent is:
1. A mobile device for handling material comprising:
   (a) a frame including elongated first and second spaced side members,
   (b) ground engaging means mounted on each side of said side members for providing mobility to said frame,
   (c) first and second side mounts secured substantially centrally of and extending upwardly of said first and second frame side members, respectively,
   (d) a turntable pivotally connected to and centrally of the upper extend of said side mounts for pivotal movement transversely of and above said frame,
   (e) means connected to said frame and said turntable for pivoting said turntable,
   (f) a source of power mounted on said frame centrally transversely thereof and in a plane below that of said turntable,
   (g) means carried by said turntable for rotation of said turntable throughout 360°,
   (h) a boom having an inner portion pivotally connected to an outer portion,
   (i) material handling means mounted on the outer end of said boom,
   (j) a support secured at its inner end to the top of said turntable substantially on a diameter of said turntable, and parallely disposed relative to said frame with the outer end of the support extending to a point outwardly of and offset from said turntable but within the extent of the width of the ground engaging means when the turntable is rotated,
   (k) the inner end of said inner boom portion pivotally connected to the outer end of said support with said boom overlying said turntable on substantially a diameter of said turntable with said material handling means oppositely disposed to said support,
   (l) a ram having its lower end pivotally connected to said turntable at a point offset from the axis of the turntable and intermediate the axis of the turntable and the pivotal connection of the inner end of the boom to the support and in alignment with the inner end of said boom with the upper end of the ram connected to said boom, whereby the boom may be pivotally raised and lowered over the turntable and when fully lowered, the inner and outer portions of the boom and the material handling means extend within the horizontal transverse extend of the ground engaging means,
   (m) means secured to the top of said turntable and alongside said boom and ram for supporting an operator rotatable and pivotal with said turntable and boom, and
   (n) means associated with said source of power for actuating said turntable, said boom, said ground engaging means and said material handling means.
2. The device of claim 1 in which said means for pivoting said turntable includes:
   (a) a first hydraulic ram connected to said turntable and one side of said frame for tilting said turntable in one direction transversely of the frame, and
   (b) a second hydraulic ram connected to said turntable and the opposite side of said frame for tilting said turntable transversely of the frame in the opposite direction.
3. The device of claim 2 further characterized in said ground engaging means including endless tracks.
4. The device of claim 1 in which said means for supporting an operator includes a cab mounted on said turntable alongside said boom and ram.

* * * * *